United States Patent [19]

Nagao et al.

[11] Patent Number: 5,675,438

[45] Date of Patent: Oct. 7, 1997

[54] AUTOMATIC ANTIGLARE MIRROR

[75] Inventors: Mitsuyoshi Nagao; Hidenori Sato, both of Fujieda, Japan

[73] Assignee: Murakami Corporation, Japan

[21] Appl. No.: 538,229

[22] Filed: Oct. 3, 1995

[30] Foreign Application Priority Data

Nov. 10, 1994 [JP] Japan .................. 6-301322

[51] Int. Cl.[6] .................. G02B 5/08; G02B 27/00; G02F 1/15; G02F 1/153
[52] U.S. Cl. .................. 359/603; 359/601; 359/604; 359/265; 359/267
[58] Field of Search .................. 359/601, 603, 359/604, 265, 267, 884; 250/214 AL, 205, 201.1, 214 LS

[56] References Cited

U.S. PATENT DOCUMENTS

| | | | |
|---|---|---|---|
| 4,676,601 | 6/1987 | Itoh et al. | 359/38 |
| 4,793,690 | 12/1988 | Gahan et al. | 359/604 |
| 4,886,960 | 12/1989 | Molyneux et al. | 250/209 |
| 4,896,030 | 1/1990 | Miyaji | 250/201 |
| 5,204,778 | 4/1993 | Bechtel | 359/604 |
| 5,406,414 | 4/1995 | O'Farrell et al. | 359/604 |
| 5,469,296 | 11/1995 | Ohno et al. | 359/604 |

Primary Examiner—Paul M. Dzierzynski
Assistant Examiner—Mohammad Y. Sikder
Attorney, Agent, or Firm—Hedman, Gibson & Costigan, P.C.

[57] ABSTRACT

An automatic antiglare mirror for a vehicle with its reflectivity being variably controlled by an electrochromic element includes a rear light detection circuit for detecting quantity of light in the rear of the vehicle, a coloration amount control circuit for controlling an amount of coloration the electrochromic element and a response speed control circuit for controlling response speed of the electrochromic element. The coloration amount control circuit performs control of the amount of coloration in such a manner that, when quantity of rear light is smaller, the amount of coloration of the electrochromic element is smaller whereas, when the quantity of rear light is larger, the amount of coloration of the electrochromic element is larger. The response speed control circuit performs control of the response speed in such a manner that, when the quantity of rear light is smaller, the response speed of the electrochromic element in a color imparting direction is lower whereas, when the quantity of rear light is larger, the response speed of the electrochromic element in the color imparting direction is higher.

4 Claims, 11 Drawing Sheets

OUTPUT OF
INVERTER 32

REAR LIGHT=SURROUNDING LIGHT
(t1 = t2)

FADING   COLORING

REAR LIGHT>SURROUNDING LIGHT
(t1 < t2)

REAR LIGHT<SURROUNDING LIGHT
(t1 > t2)

$$\left( \begin{array}{l} \text{\scriptsize{▨}} : \text{COLOR FADING ENERGY} \\ \text{\scriptsize{▨}} : \text{COLOR IMPARTING ENERGY} \end{array} \right)$$

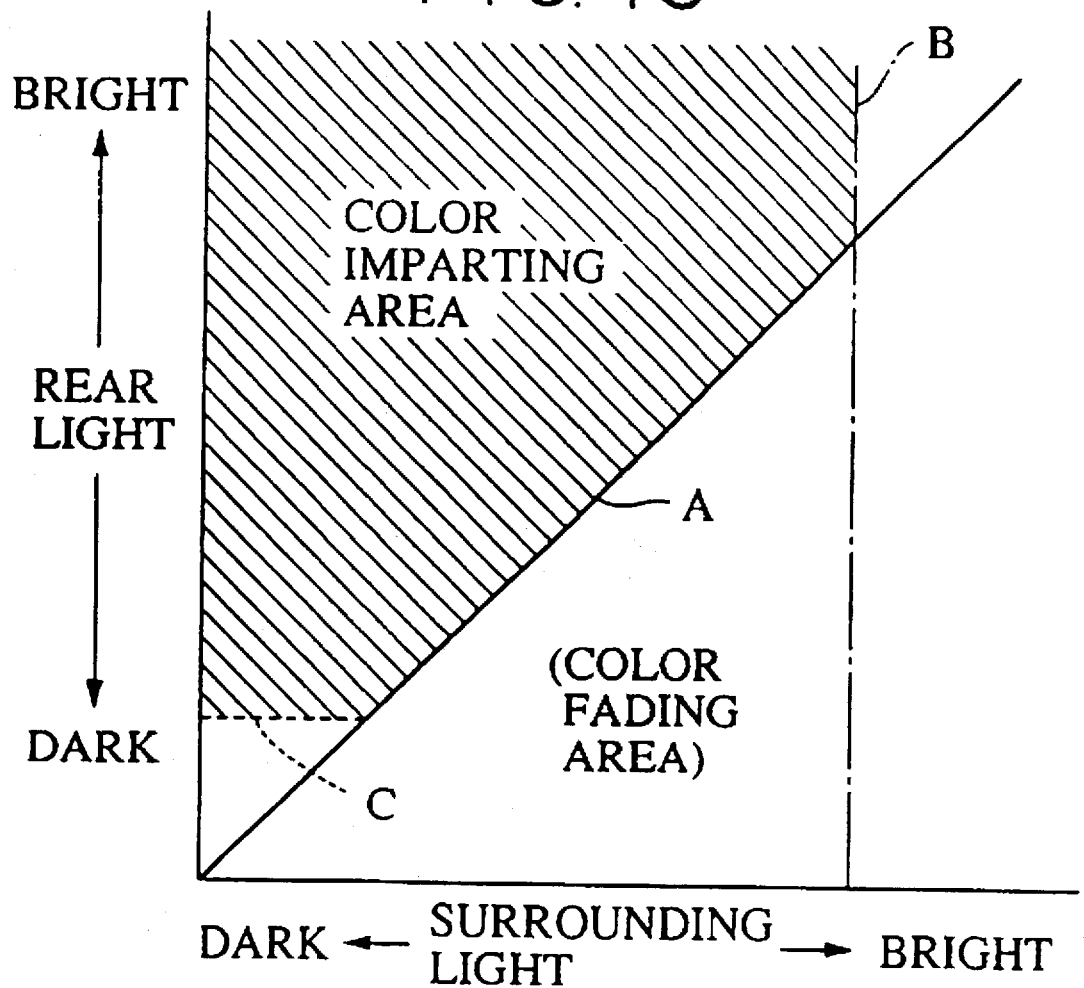

FIG. 14A WHEN REAR LIGHT IS BRIGHT
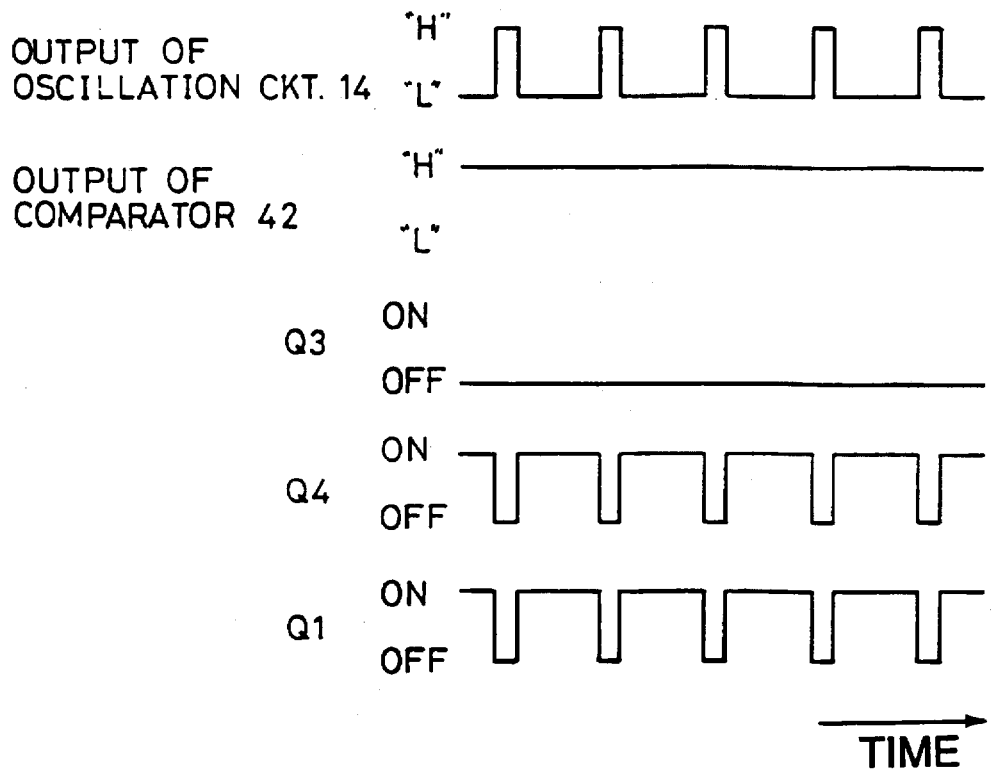
FIG. 14B WHEN REAR LIGHT IS DARK
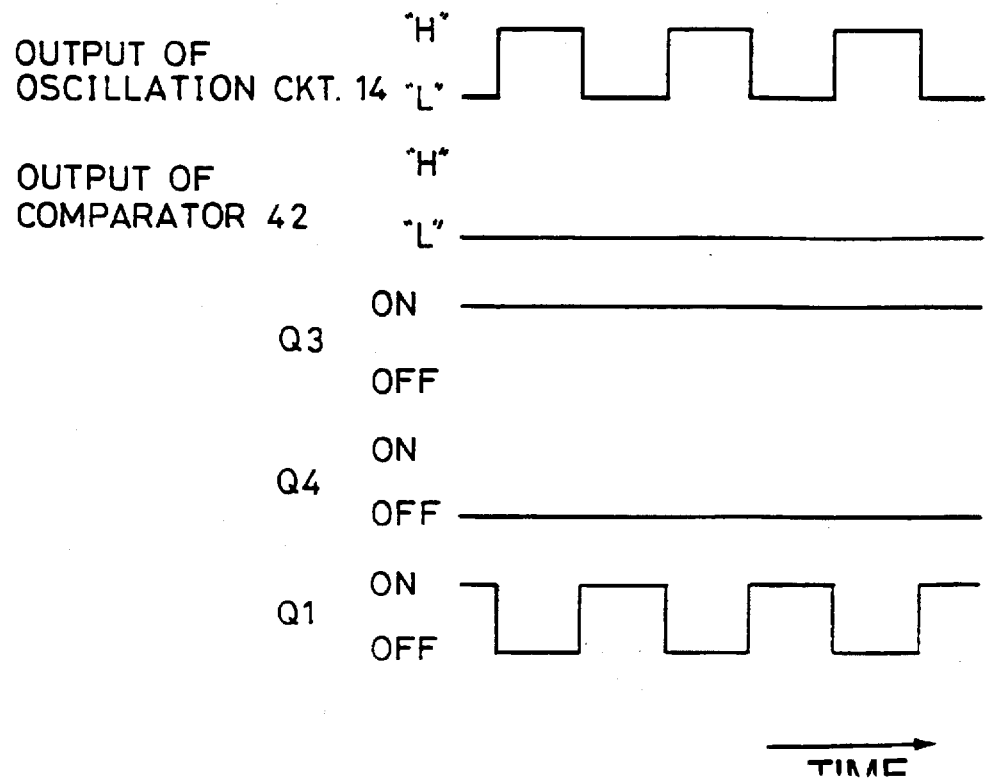

AUTOMATIC ANTIGLARE MIRROR

BACKGROUND OF THE INVENTION

This invention relates to an automatic antiglare mirror, i.e., an electrochromic (hereinafter abbreviated as "EC") antiglare mirror used as an inside or outside mirror of a vehicle and, more particularly, to an EC antiglare mirror capable of preventing excessively frequent change or excessively great change in reflectivity relative to a slight change in light which is irritating to a driver of a vehicle and also capable of reducing glare of light by immediate coloring when glare of rear light has suddenly increased by, for example, headlights of a following vehicle while running at night.

An EC antiglare mirror is made by covering the front surface of the reflecting surface of a mirror with an EC element film which achieves an antiglare effect against light from headlights of a succeeding vehicle while running at night by changing the amount of coloration of the EC element and thereby controlling reflectivity of the mirror. For obtaining such an antiglare effect, the EC antiglare mirror has its amount of coloration automatically controlled in such a manner that, upon detection of quantity of incident rear light, the amount of coloration increases (i.e., reflectivity decreases) when the rear light is strong whereas the amount of coloration decreases (the color fades, i.e., reflectivity increases) when the rear light is weak.

As an example of a drive device for an EC antiglare mirror, there is Japanese Patent Application No. 99291/1994 filed by the same assignee of the present invention. In this device, amounts of surrounding light and rear light are detected, a pulse signal is produced whose duty factor is changed in accordance with these amounts and reflectivity of the mirror is continuously changed by driving the EC element in response to this pulse signal. FIG. 2 is a control block diagram showing this EC antiglare mirror drive device is shown in FIG. 2.

A surrounding light quantity detection circuit 10 detects quantity of light surrounding a vehicle and is disposed in a mirror housing of, for example, an inside or outside mirror facing forward of the vehicle. A rear light quantity detection circuit 12 detects quantity of light from the rear of the vehicle and is disposed in the mirror housing facing rearward of the vehicle, An oscillation circuit 14 generates oscillation signals of "H" level and "L" level alternately and repeatedly, The oscillation circuit 14 is so constructed that duration of the "H" level and duration of the "L" level can be individually controlled. Oscillation period of the oscillation circuit 14 should preferably be 10 ms or below for concealing the glare of the light in fading and imparting of color from the human eye. An inversion period control circuit 16 variably controls duration of one of the "H" and "L" levels of the oscillation signals generated by the oscillation circuit 14 in response to the light quantity detected by the surrounding light quantity detection circuit 10. The inversion period control circuit 16 variably controls duration of the other of the "H" and "L" levels of the oscillation signals generated by the oscillation circuit 14 in response to the light quantity detected by the rear light quantity detection circuit 12.

An EC element 20 is formed in the form of a film on the front surface of the mirror. A drive power source 22 supplies a drive power to the oscillation circuit 14 and the EC element 20. An EC element drive circuit 24 inverts the polarity of the drive voltage supplied from the drive power source 22 and applies the inverted voltage to the EC element 20 in accordance with the level of an oscillation signal generated by the oscillation circuit 14, thereby controlling the amount of coloration in accordance with the duty factor of the oscillation signal.

The control of the duty factor by the inversion period control circuit 16 is as follows:

The inversion period control circuit 16 performs control, when the EC element drive circuit 24 is so set that it drives the EC element 20 in a color imparting direction at one level of the oscillation signal and in a color fading direction at the other level of the oscillation signal, in such a manner that, when the surrounding light quantity is larger, the duration of the one level is shorter and, when the surrounding light quantity is smaller, the duration of the one level is longer and that when the rear light quantity is larger, the duration of the other level is shorter and, when the rear light quantity is smaller, the duration of the other level is larger and, when the EC element drive circuit 24 is so set that it drives the EC element 20 in a color fading direction at the one level of the oscillation signal and in a color imparting direction at the other level of the oscillation signal, in such a manner that, when the surrounding light quantity is larger, the duration of the one level is longer and, when the surrounding light quantity is smaller, the duration of the one level is shorter and that, when the rear light quantity is larger, the duration of the other level is longer and, when the rear light quantity is smaller, the duration of the other level is shorter.

By this control, the amount of coloration is continuously controlled. That is, when the surrounding light is weak, sensitivity to the rear light increases and the amount of coloration increases with an increase of the rear light quantity so that reflectivity drops and an antiglare state is realized. When the surrounding light is strong, sensitivity to the rear light decreases with resulting increase in difficulty in coloration and maintenance of a high reflectivity.

A specific example of the EC element drive circuit 24 is shown in FIG. 3. In the oscillation signal provided by the oscillation circuit 14 of FIG. 2, as shown in FIG. 4, period t1 of "H" level changes in response to rear light quantity (i.e., the period becomes shorter as the light quantity increases) and period t2 of "L" level changes in response to surrounding light quantity (i.e., the period becomes shorter as the light quantity increases).

The EC element drive circuit 24 has two switching transistors Q1 and Q2 which are complementary push-pull connected between positive and negative power source voltages of about +1.6 V and −1.6 V. Resistances R6 and R7 are connected in series between the power supply line of about +1.6 V and the output terminal of the oscillation circuit 14 and voltage at the junction of the resistances R6 and R7 is applied to the base of the transistor Q1. Resistances R8 and R9 are connected in series between the power supply line of about −1.6 V and the output terminal of the oscillation circuit 14 and voltage at the junction of the resistances R8 and R9 is applied to the base of the transistor Q2. By adopting this construction, when the output of the oscillation circuit 14 is at the "H" level, the transistor Q1 is turned off and the transistor Q2 is turned on thereby supplying energy in the color fading direction to the EC element 20. When the output of the oscillation circuit 14 is at the "L" level, the transistor Q1 is turned on and the transistor Q2 is turned off thereby supplying energy in the color imparting direction to the EC element 20. Since resistances R10 and R11 which constitute energy supply restricting elements are connected in series to the transistors Q1 and Q2, supply of energy (supply of current) in the color imparting and color fading directions is restricted whereby power consumption and heating of the EC element 20 are restricted. Since the EC element 20 is electrically the same as capacity, time constant circuits are established with the resistances R10 and R11 (R10 and R11 are respectively 5 Ω) whereby speed of response in color imparting and color fading is reduced. Accordingly, while running at night, too frequent repetition of coloration and color fading which is caused by street lights, shop lights and headlights of vehicles running on the opposite lane and its consequent irritation to the driver can be effectively prevented.

Relation between the duty factor (t1/(t1+t2)) of the drive pulse produced by the EC element drive circuit 24 of FIG. 3 and reflectivity of the mirror is shown in FIG. 5. In this circuit, as the duty factor of an input pulse signal increases, the EC element 20 is driven in the color fading direction and reflectivity therefore increases whereas as the duty factor decreases, the EC element is driven in the color imparting direction and reflectivity therefore decreases. When the duty factor has exceeded a certain value (point b), the reflectivity of the mirror becomes constant at the highest reflectivity (e.g., 70%) whereas, when the duty factor has become lower than a certain point (point a), the reflectivity of the mirror becomes constant at the lowest reflectivity (e.g., 10%). The region between the point a and the point b is a region in which the reflectivity changes continuously (hereinafter referred to as "continuously changing reflectivity region"). In the continuously changing reflectivity region, the ratio of change of the mirror reflectivity to the duty factor becomes substantially constant.

According to the EC element drive circuit 24 of FIG. 3, the color imparting current supplied to the EC element 20 is restricted by the resistance R10 and, therefore, when glare by rear light has suddenly increased at night, the mirror is not immediately colored in response to the increase of glare and this irritates a driver of a vehicle. This problem will be overcome if resistance 10 is reduced to a small value because this will increase the speed of response in the color imparting direction. If, however, values of resistances R10 and R11 are reduced, imparting and fading of color will be repeated too frequently in response even to a slight change in light and this will be also irritating to the driver. Further, if the values of the resistances R10 and R11 are made small, as shown in FIG. 6, the ratio of change in the mirror reflectivity to change in the duty factor becomes large (the ratio of change in the mirror reflectivity changes even if the duty factor remains the same because the amount of energy supplied to the mirror changes by changing the value of current supplied to the mirror) and, as a result, the continuously changing reflectivity region is narrowed and reflectivity therefore changes largely to a slight change in the quantity of light and this becomes another cause of irritation to the driver.

It is, therefore, an object of the invention to provide an automatic antiglare mirror which is capable of preventing an excessively frequent change in reflectivity to a slight change in the light quantity which is irritating to a driver and which is also improved in response to sudden increase in glare from the rear caused by headlights of a succeeding vehicle while running at night so that the mirror will be colored immediately to mitigate the glare.

SUMMARY OF THE INVENTION

For achieving the above described object of the invention there is provided an automatic antiglare mirror for a vehicle with its reflectivity being variably controlled by an electrochromic element comprising at least rear light detection means for detecting quantity of light in the rear of the vehicle, coloration amount control means for controlling an amount of coloration of the electrochromic element, and response speed control means for controlling response speed of the electrochromic element, said coloration amount control means performing control of the amount of coloration in such a manner that, when quantity of rear light is smaller, the amount of coloration of the electrochromic element is smaller whereas, when the quantity of rear light is larger, the amount of coloration of the electrochromic element is larger, and said response speed control means performs control of the response speed in such a manner that, when the quantity of rear light is smaller, the response speed of the electrochromic element in a color imparting direction is lower whereas, when the quantity of rear light is larger, the response speed of the electrochromic element in the color imparting direction is higher.

According to the invention, the response speed of the electrochromic element in the color imparting direction is lower when the quantity of rear light is smaller and, therefore, too frequent change in reflectivity to a slight change in the quantity of light can be prevented. Besides, the response speed of the electrochromic element in the color imparting direction is higher when the quantity of rear light is larger and, therefore, the electrochromic element is colored immediately to mitigate glare when headlights are suddenly illuminated from the rear at night.

In one aspect of the invention, there is provided an automatic antiglare mirror including an electrochromic element wherein its reflectivity is variably controlled by driving the electrochromic element by a pulse voltage and changing duty factor of the pulse voltage in response at least to quantity of rear light so that, when the quantity of rear light is smaller, an amount of coloration of the electrochromic element is smaller whereas, when the quantity of rear light is larger, the amount of coloration of the electrochromic element is larger, said automatic antiglare mirror comprising reflectivity change ratio changing means for changing ratio of change in the reflectivity to the duty factor of the pulse voltage in such a manner that, when a duty factor in a color imparting direction is smaller or a duty factor in a color fading direction is larger, the ratio of change in the reflectivity to the duty factor is smaller whereas, when the duty factor in the color imparting direction is larger or the duty factor in the color fading direction is smaller, the ratio of change in the reflectivity to the duty factor is larger.

According to this aspect of the invention, in driving the electrochromic element, the ratio of change in reflectivity to the duty factor of the pulse voltage is smaller when the duty factor in the color imparting direction (the amount of coloration increases with the duty factor) is smaller or the duty factor in the color fading direction (the amount of color fading increases with the duty factor) is larger. By this arrangement, a large change in reflectivity to a slight change in the quantity of light can be prevented. Besides, since the ratio of change in reflectivity to the duty factor is larger when the duty factor in the color imparting direction is larger or the duty factor in the color fading direction is smaller, the reflectivity decreases largely to mitigate glare when headlights are suddenly illuminated from the rear at night.

In another aspect of the invention, an automatic antiglare mirror including an electrochromic element wherein its reflectivity is variably controlled by driving the electrochromic element by a pulse voltage and changing duty factor of the pulse voltage in response at least to quantity of rear light so that, when the quantity rear light is smaller, an amount of coloration of the electrochromic element is smaller whereas, when the quantity of rear light is larger, the amount of coloration of the electrochromic element is larger, said automatic antiglare mirror comprising current value control means for controlling a current value of the pulse voltage driving the electrochromic element in such a manner that, when the quantity of rear light is smaller, the current value of the pulse voltage in a color imparting direction is smaller whereas, when the quantity of rear light is larger, the current value is larger.

According to this aspect of the invention, in driving the electrochromic element by the pulse voltage, the current value of the pulse voltage in the color imparting direction is smaller when the quantity of rear light is smaller and, therefore, too frequent change in the reflectivity to a slight change in the quantity of light and a large change in the reflectivity can be prevented. Besides, since the current value of the pulse voltage in the color imparting direction is larger when the quantity of rear light is larger, the reflectivity decreases immediately and largely to mitigate glare when headlights are suddenly illuminated from the rear at night.

In still another aspect of the invention, in the automatic antiglare mirror of this aspect of the invention, said current value control means controls the current value in response to the duty factor of the pulse voltage.

According to this aspect of the invention, the invention can be realized easily by controlling the current value of the pulse voltage in response to the duty factor of the pulse voltage.

Preferred embodiments of the invention will be described below with reference to the accompanying drawings.

BRIEF DESCRIPTION OF THE DRAWINGS

In the accompanying drawings,

FIG. 13 is a diagram showing an ideal division between a color imparting area and a color fading area due to relation between the quantity of surrounding light and the quantity of rear light; and FIG. 14 is a time chart showing an operation of a color imparting current change circuit 34.

DESCRIPTION OF PREFERRED EMBODIMENTS

Figure 1:
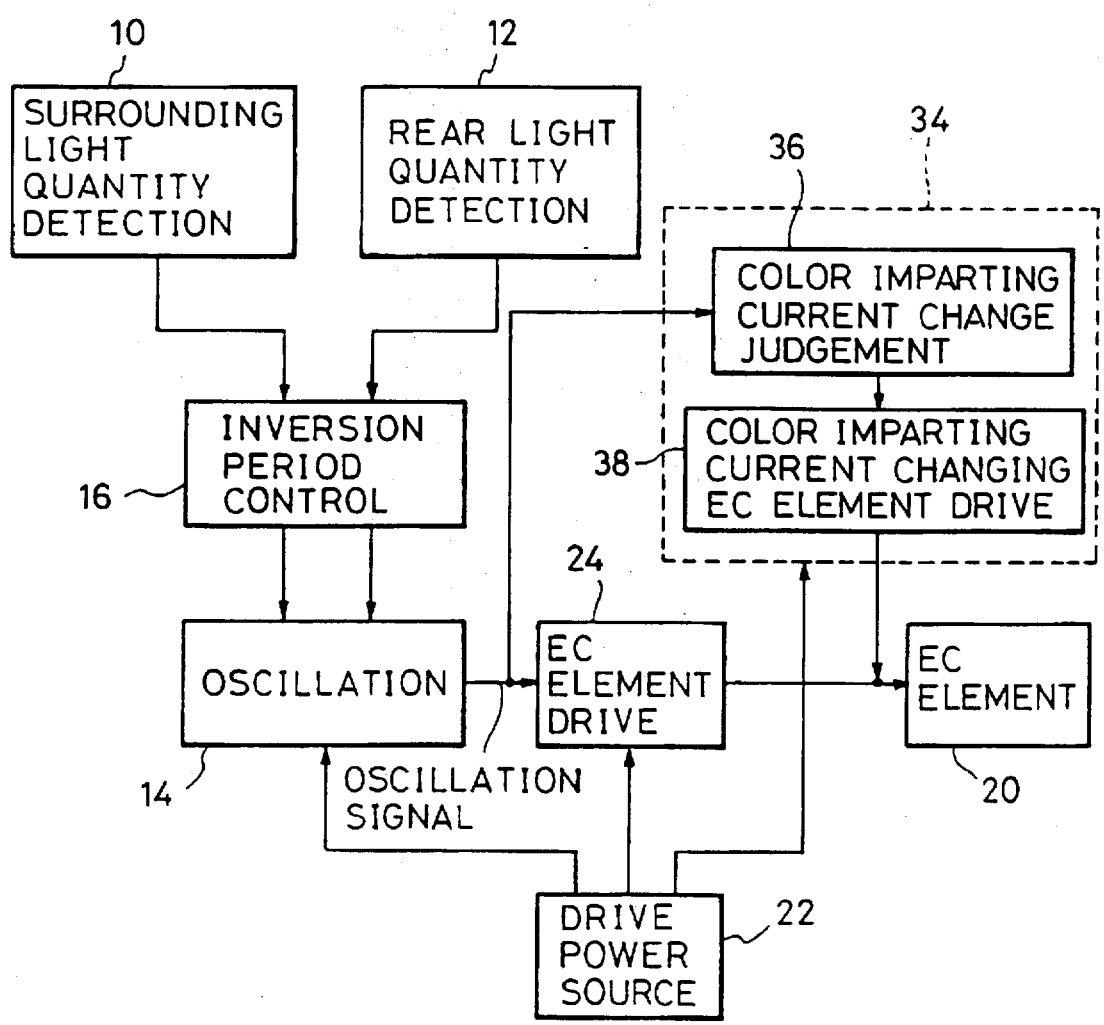
FIG. 1 is a block diagram showing an embodiment of the invention.
Figure 2:
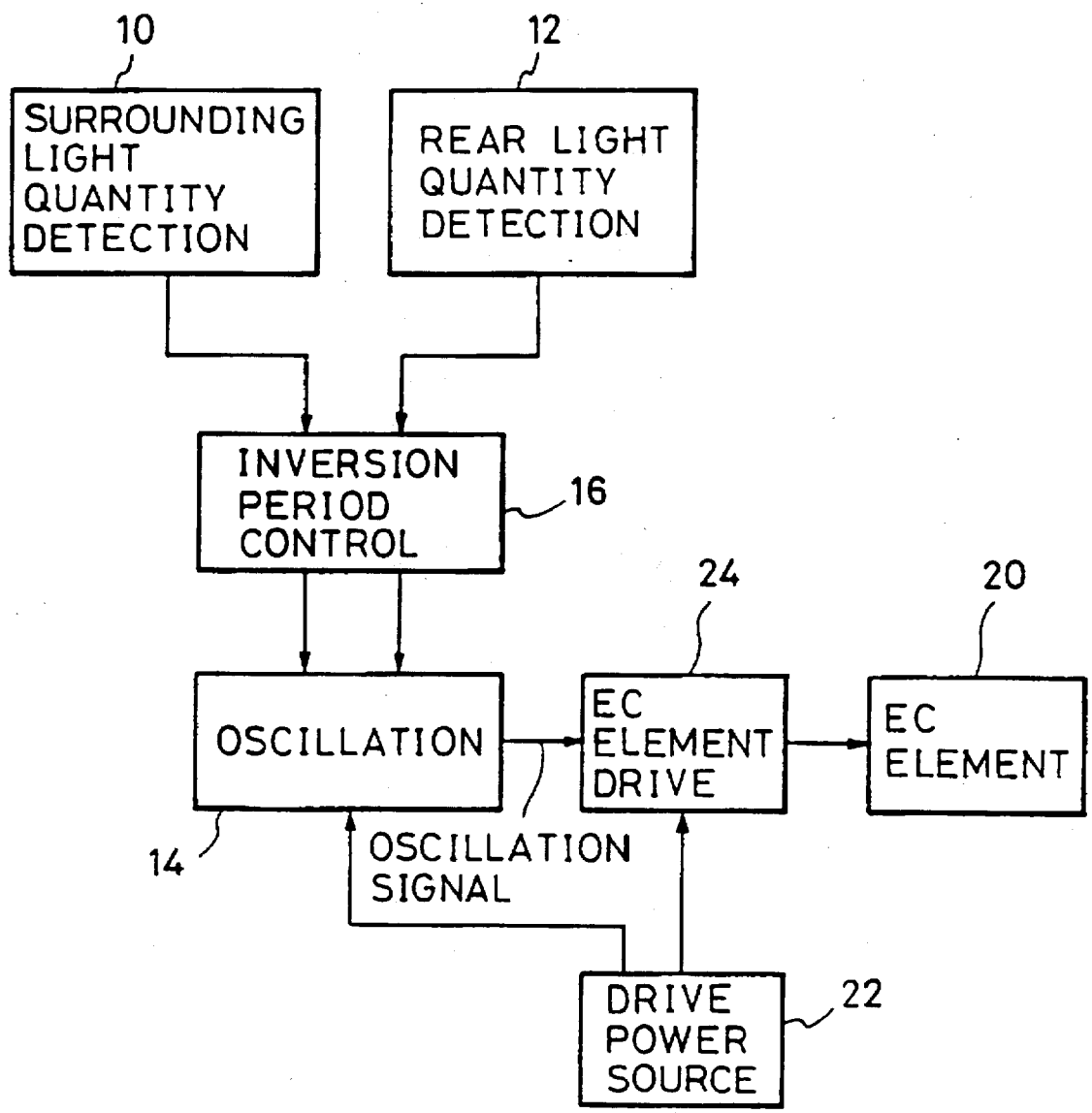
FIG. 2 is a block diagram showing a prior art device.
Figure 3:
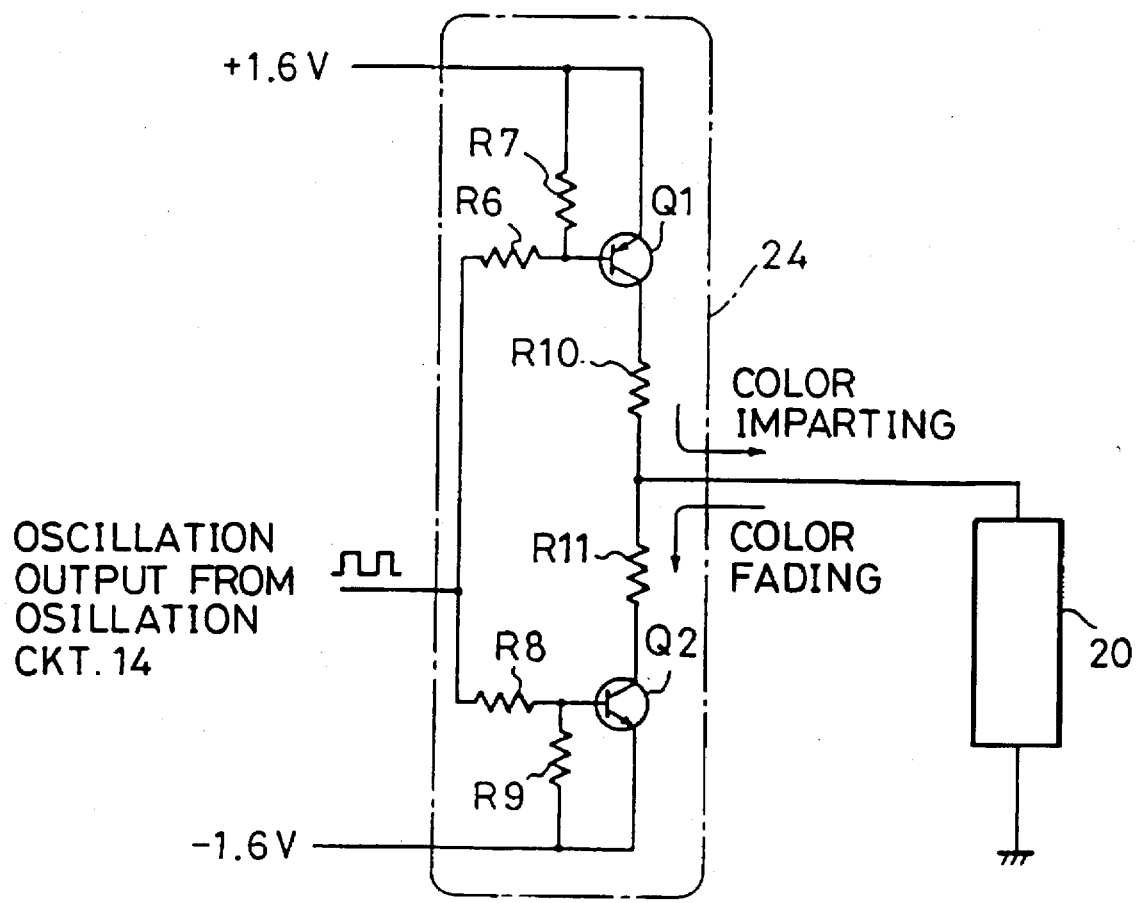
FIG. 3 is a circuit diagram showing a specific example of an EC element drive circuit 12 shown in FIG. 2.

FIG. 1 shows an embodiment of the invention. A surrounding light quantity detection circuit 10 detects quantity of light surrounding a vehicle and is disposed in a mirror housing of, for example, an inside or outside mirror facing forward of the vehicle. A rear light quantity detection circuit 12 detects quantity of light from the rear of the vehicle and is disposed in the mirror housing facing rearward of the vehicle.

An oscillation circuit 14 generates oscillation signals of "H" level and "L" level alternately and repeatedly. The oscillation circuit 14 is so constructed that duration of the "H" level and duration of the "L" level can be individually controlled. Oscillation period of the oscillation circuit 14 should preferably be 10 ms or below for concealing the glare of the light in fading and imparting of color from the human eye. An inversion period control circuit 16 variably controls duration of one of the "H" and "L" levels of the oscillation signals generated by the oscillation circuit 14 in response to the light quantity detected by the surrounding light quantity detection circuit 10. The inversion period control circuit 16 variably controls duration of the other of the "H" and "L" levels of the oscillation signals generated by the oscillation circuit 14 in response to the light quantity detected by the rear light quantity detection circuit 12.

An EC element 20 is formed in the form of a film on the front surface of the mirror. A drive power source 22 supplies a drive power to the oscillation circuit 14, an EC element drive circuit 24 and a color imparting current changing circuit 34. The EC element drive circuit 24 inverts the polarity of the drive voltage supplied from the drive power source 22 and applies the inverted voltage to the EC element 20 in accordance with the level of an oscillation signal generated by the oscillation circuit 14, thereby controlling the amount of coloration in accordance with duty factor of the oscillation signal.

The control of duty factor by the inversion period control circuit 16 is as follows:

The inversion period control circuit 16 performs control, when the EC element drive circuit 24 is so set that it drives the EC element 20 in a color imparting direction at the one level of the oscillation signal and in a color fading direction at the other level of the oscillation signal, in such a manner that, when the surrounding light quantity is larger, the duration of the one level is shorter and, when the surrounding light quantity is smaller, the duration of the one level is longer and that, when the rear light quantity is larger, the duration of the other level is shorter and, when the rear light quantity is smaller, the duration of the other level is larger and, when the EC element drive circuit 24 is so set that it drives the EC element 20 in a color fading direction at the one level of the oscillation signal and in a color imparting direction at the other level of the oscillation signal, in such a manner that, when the surrounding light quantity is larger, the duration of the one level is longer and, when the surrounding light quantity is smaller, the duration of the one level is shorter and that, when the rear light quantity is larger, the duration of the other level is longer and, when the rear light quantity is smaller, the duration of the other level is shorter, By this control, the amount of coloration is continuously controlled. That is, when the surrounding light is weak, sensitivity to the rear light increases and the amount of coloration increases with increase of the rear light quantity so that reflectivity drops and an antiglare state is realized. When the surrounding light is strong, sensitivity to the rear light decreases with resulting increase in difficulty in coloration and maintenance of a high reflectivity.

The color imparting current changing circuit 34 constitutes the response speed control means or the reflectivity changing ratio changing means or the current value control means. The color imparting current changing circuit 34 supplies, in parallel with the EC element drive circuit 24, a drive current in the color imparting direction to the EC element 20. By turning on and off this circuit 34 automatically in response to the detected quantity of light, the value of the drive current in the color imparting direction supplied to the EC element 20 is changed. When, for example, the rear light quantity is small, the color imparting current changing circuit 34 is off thereby causing the drive current from the EC element drive circuit 24 only to be supplied to the EC element 20 whereas when the rear light quantity is large (for example, glare from the rear suddenly takes place at night), the color imparting current changing circuit 34 is turned on and, in this case, drive currents from both the EC element drive circuit 24 and the color imparting current changing circuit 34 are supplied to the EC element 20.

The color imparting current changing circuit 34 consists of a color imparting current change judgement circuit 36 and a color imparting current changing EC element drive circuit 38. The color imparting current change judgement circuit 36 receives an oscillation signal generated by the oscillation circuit 14 and, in response to the duty factor of the oscillation signal, judges whether a drive current should be supplied from the color imparting current changing EC element drive circuit 38 or not. The color imparting current changing EC element drive circuit 38 supplies the drive current to the EC element 20 in response to the output signal of the color imparting current change judgement circuit 36.

Figure 7:
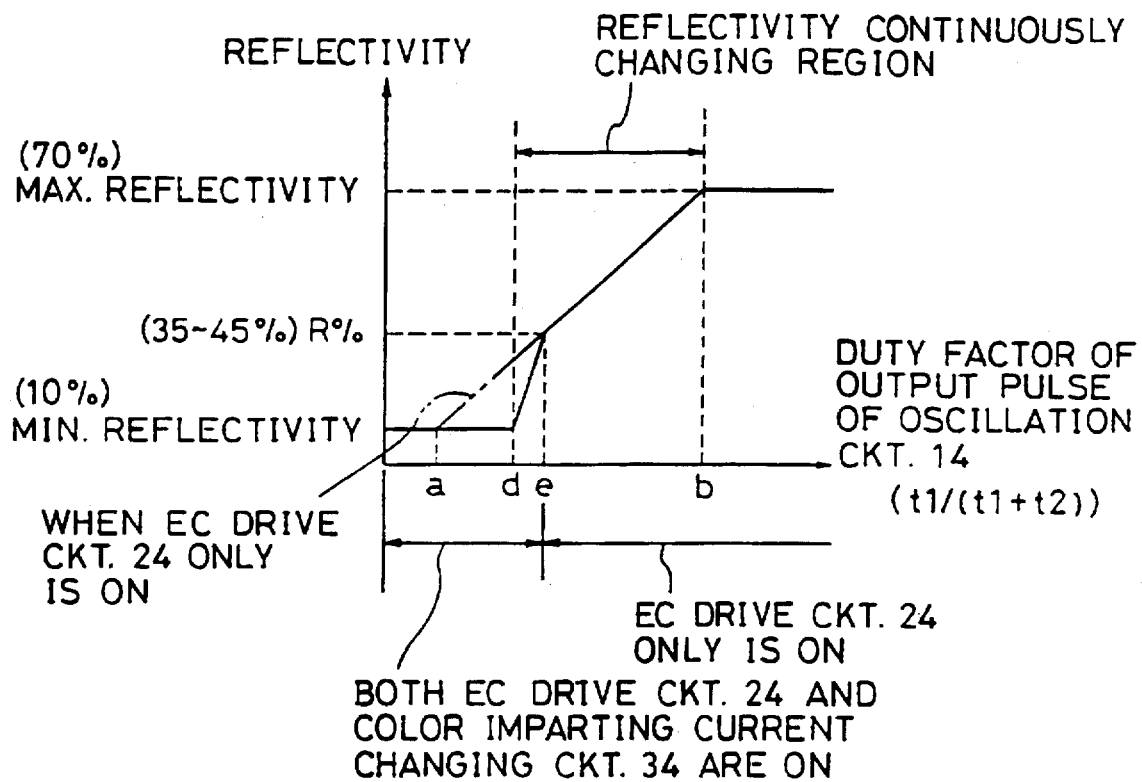
FIG. 7 is a diagram showing change characteristic of mirror reflectivity to the duty factor of the device of FIG. 1 on the basis of the oscillation output of FIG. 4.

Relation between the duty factor of the drive pulse of the EC antiglare mirror drive device of FIG. 1 (i.e., the output pulse of the oscillation circuit 14) and the reflectivity of the mirror is shown in FIG. 7. In this figure, as in FIG. 4, "H" of the drive pulse corresponds to a drive in the color fading direction and "L" corresponds to a drive in the color imparting direction. Therefore, as the duty factor increases, the amount of drive in the color fading direction increases so that reflectivity increases whereas as the duty factor decreases, the amount of drive in the color imparting direction increases so that reflectivity decreases.

According to FIG. 7, in a region in which the duty factor is higher than duty factor e corresponding to a predetermined reflectivity R % (e.g., reflectivity of 35% to 45% is practically optimum), the color imparting current drive circuit 34 is turned off thereby causing the drive current from the EC element drive circuit 24 only to be supplied and, in a region in which the duty factor is lower than the duty factor e, the drive currents from both the EC element drive circuit 24 and the color imparting current changing circuit 34 are supplied. Accordingly, when the duty factor is higher than e (i.e., when the rear light quantity is smaller assuming that the surrounding light quantity is constant), the response speed of the EC element 20 to change in the rear light quantity becomes lower and, as a result, too frequent change in reflectivity can be prevented. When the duty factor is higher than e (i.e., when the rear light quantity is larger), the response speed of the EC element 20 to change in the rear light quantity becomes higher and, as a result, the mirror is colored immediately to mitigate glare when glare from the rear suddenly takes place at night.

Further, according to FIG. 7, in a reflectivity continuously changing region between the minimum reflectivity (e.g., 10%) and the maximum reflectivity (e.g., 70%), the ratio of change of reflectivity to the duty factor of the drive pulse changes at the duty factor e in such a manner that in the region in which the duty factor is higher than e, the change of reflectivity is gradual whereas in the region in which the duty factor is lower than e, the change of reflectivity is steep. Therefore, when the duty factor is higher than e (i.e., when the rear light quantity is smaller assuming that the surrounding light quantity is constant), the amount of change in reflectivity to the change in the rear light quantity becomes small so that too frequent change is prevented. When the duty factor is lower than e (i.e., when the rear light quantity is larger), the amount of change in reflectivity to the change in the rear light quantity becomes large so that reflectivity decreases substantially to mitigate glare when glare from the rear suddenly takes place at night.

Figure 8:
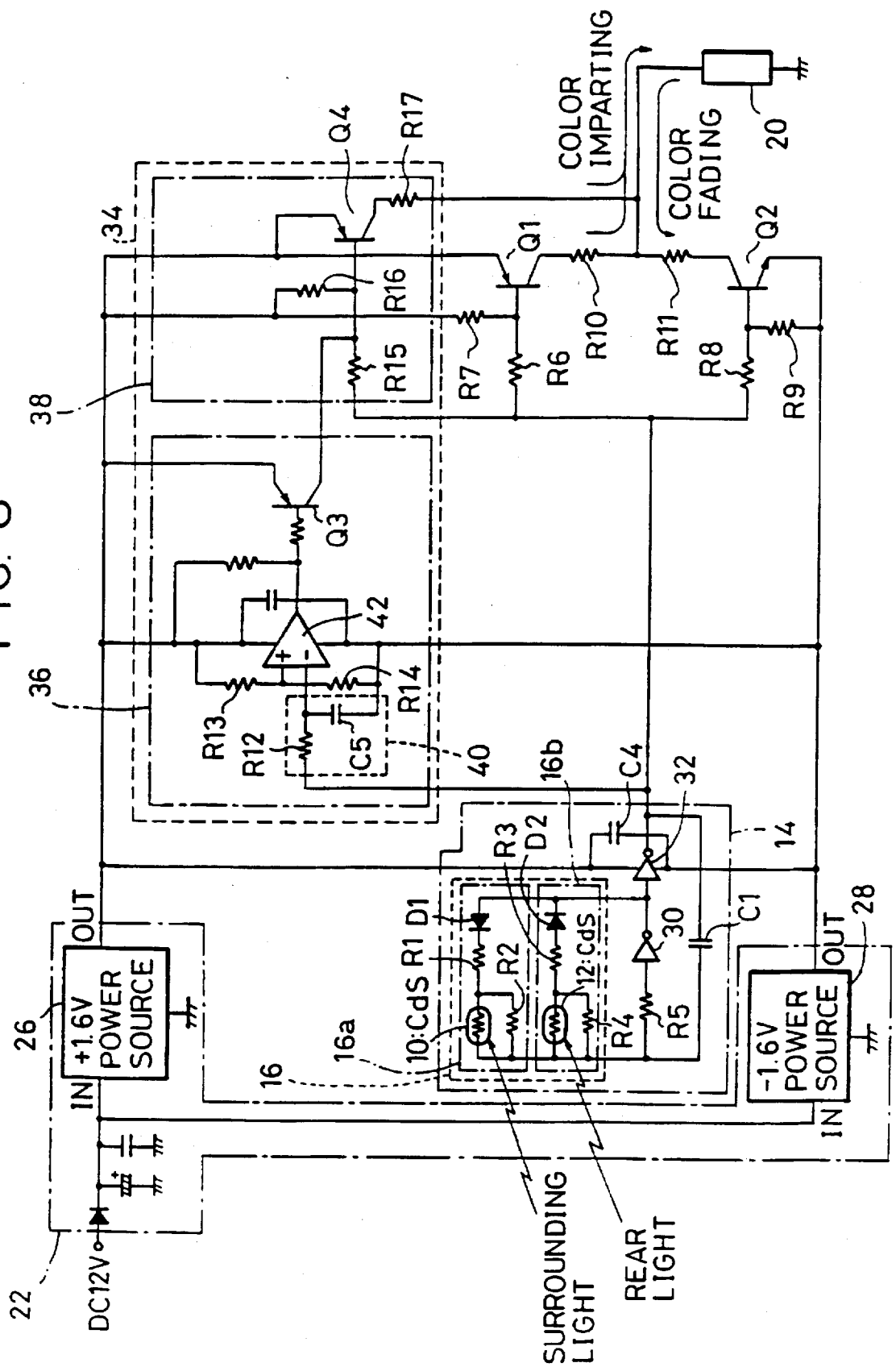
FIG. 8 is a circuit diagram showing a specific example of the embodiment of FIG. 1.

A specific example of the EC antiglare mirror drive device of FIG. 1 is shown in FIG. 8. In FIG. 8, the same component parts as those shown in FIG. 1 are designated by the same reference characters. A drive power source 22 receives dc voltage of +12 V from a battery and converts it to a dc voltage of about +1.6 V in a positive power source circuit 26 and also converts it to a dc voltage of about −1.6 V in a negative power source circuit 28. If these positive and negative power source circuits 26 and 28 are constructed of switching power supply circuits, the power source will be efficient, take little space in the mirror housing and generate little heat.

Figure 9A:
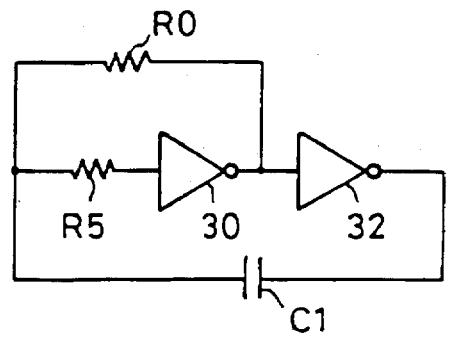
FIG. 9A is a circuit diagram showing a basic type circuit of the oscillation circuit 14.
Figure 9B:
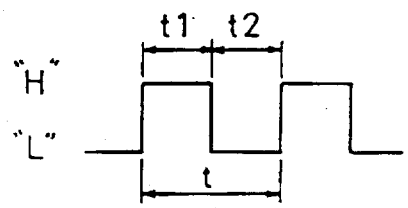
FIG. 9B is a waveform diagram showing an oscillation signal.

An oscillation circuit 14 includes an inversion period control circuit 16 in its feedback loop. The inversion period control circuit 16 includes a surrounding light quantity detection device 10 and a rear light quantity detection device 12. A basic type oscillation circuit 14 is shown in FIG. 9A. In this circuit 14, two inverters 30 and 32 are connected in series and a series circuit of a resistance R0 and a capacitor C1 is connected between the output terminal of the inverter 80 and the output terminal of the inverter 82. The input terminal of the inverter 30 is connected to the junction of the resistance R0 and the capacitor C1 through a resistance R5. In this circuit 14, the capacitor C1 is charged with time constant of R0·C1 and the outputs of the inverters 30 and 32 are inverted when this voltage exceeds a threshold level of the inverter 80 so that oscillation takes place by repetition of this operation. An oscillation signal provided by the inverter 82 by this oscillation is shown in FIG. 9B. The oscillation period t of this signal is obtained as t=2.2 R0·C1. The ratio t1:t2 of this oscillation signal becomes almost 1:1 if the inverters 80 and 82 are constructed of CMOS integrated circuits.

Figure 10A:
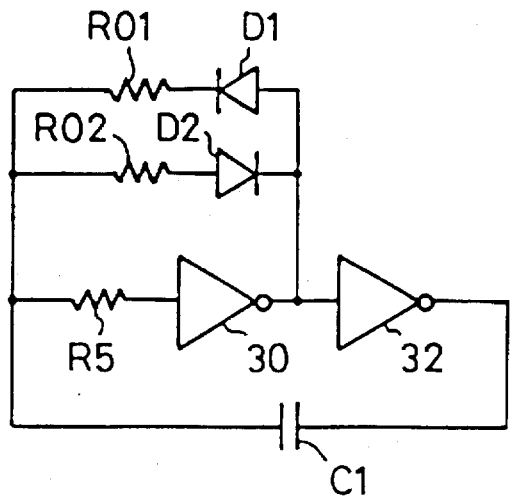
FIG. 10A is a circuit diagram showing the oscillation circuit 14 of FIG. 8 and explaining the principle of changing of the duty factor.
Figure 10B:
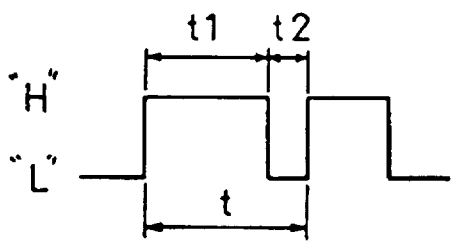
FIG. 10B is a waveform diagram showing an oscillation signal.

If the resistance R0 of FIG. 9 is replaced, as shown in FIG. 10A, by a series circuit of a resistance R01 and a diode D1 and a series circuit of a resistance R02 and a diode D2 (arranged in opposite direction to the diode D1), the route of flow of the charged current of the capacitor C1 is switched depending upon the direction of charging of the capacitor C1. In this case, as shown in FIG. 10B, period t1 of the "H" level and period t2 of the "L" level in the output pulse of the inverter 32 become respectively $t1 = R02 \cdot C1 \times 1.1$ s $t2 = R01 \cdot C1 \times 1.1$ s so that the periods t1 and t2 can be individually adjusted by the values of the resistances R01 and R02.

The oscillation circuit 14 of FIG. 8 is made on the basis of this principle. The inversion period control circuit 16 in the oscillation circuit 14 consists of a color imparting side pulse generation section 16a and a color fading side pulse generation section 16b. The color imparting side pulse generation section 16a consists of a CdS 10 which constitutes the surrounding light detection device, a resistance R1 and a diode D1 connected in series to this CdS 10, and a resistance R2 connected in parallel to the CdS 10. The color fading side pulse generation section 16b consists of a CdS 12 which constitutes the rear light detection device, a resistance R3 and a diode D2 connected in series to this CdS 12 and a resistance R4 connected in parallel to the CdS 12.

Figure 4:
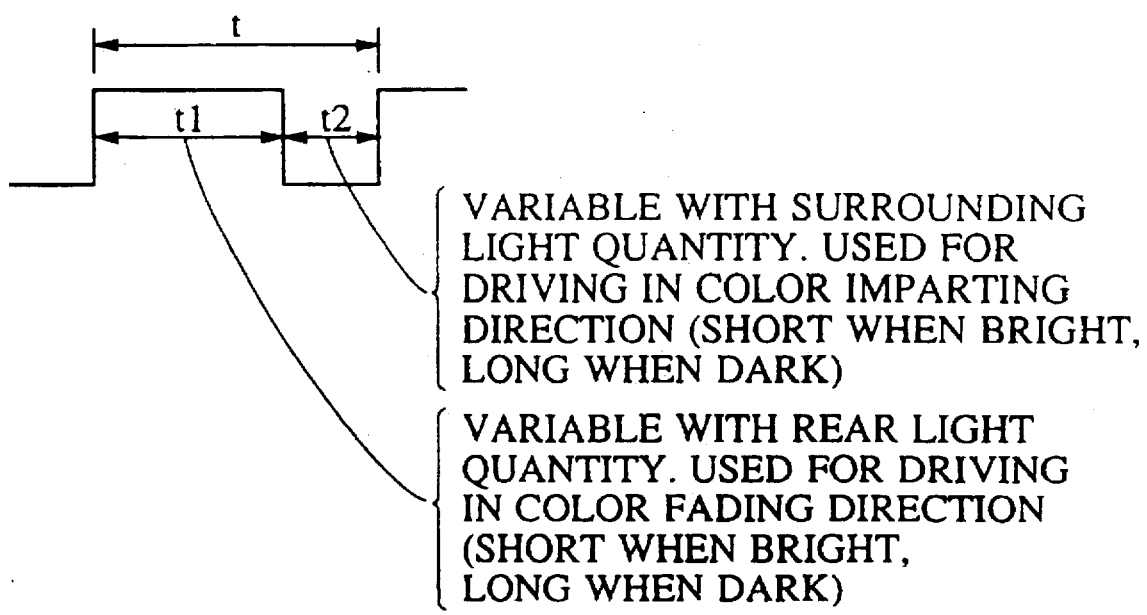
FIG. 4 is a waveform diagram showing an oscillation output of an oscillation circuit 14 shown in FIGS. 1 and 2.
Figure 5:
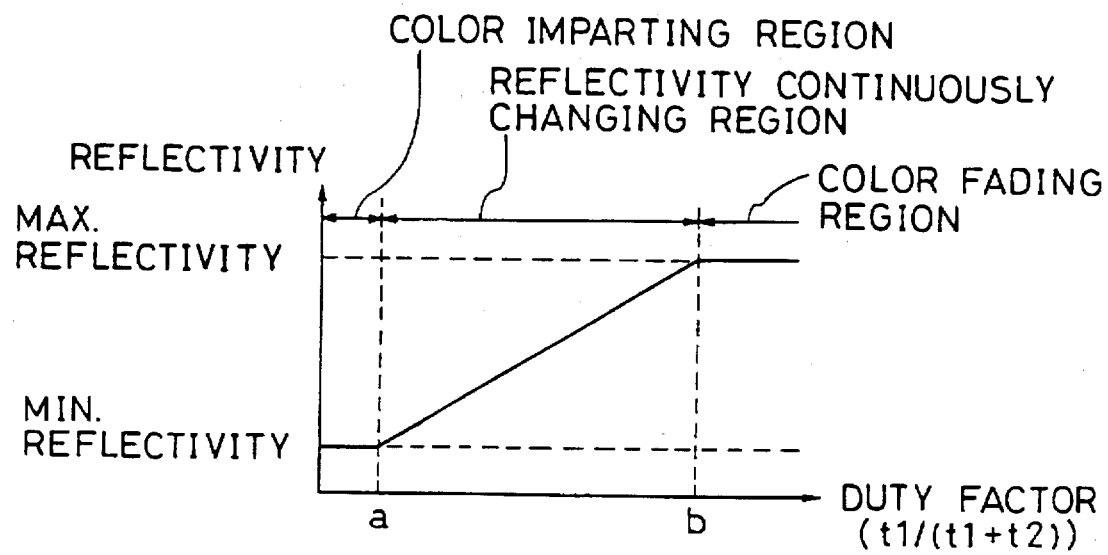
FIG. 5 is a diagram showing change characteristic of mirror reflectivity to duty factor of the prior art device of FIG. 2 on the basis of the oscillation output of FIG. 4.
Figure 6:
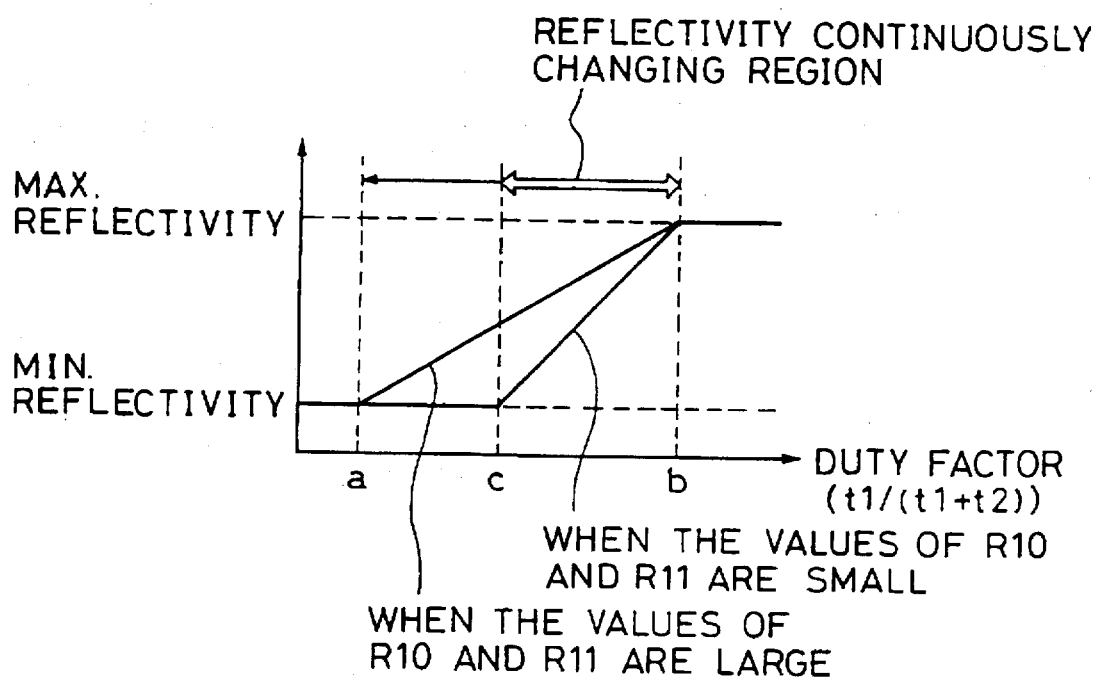
FIG. 6 is a diagram showing change characteristic of mirror reflectivity by resistances R10 and R11.
Figure 11:
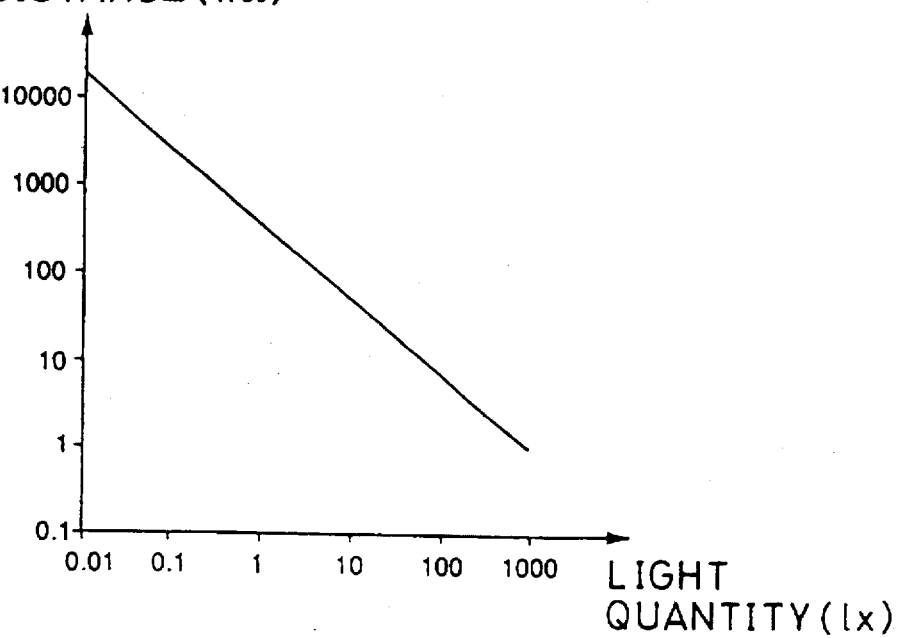
FIG. 11 is a diagram showing characteristic of CdS.
Figure 12A:
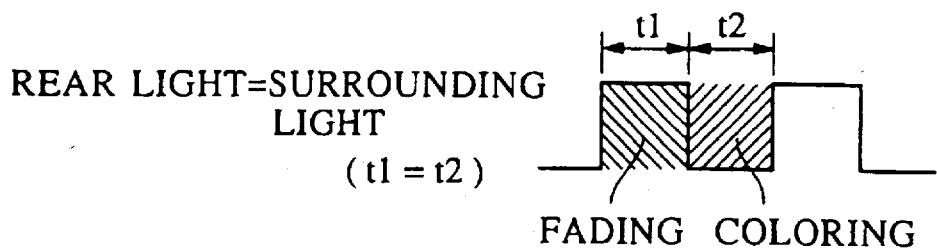
FIGS. 12A, 12B and 12C are waveform diagrams showing change in the oscillation output of the oscillation circuit 14 of FIG. 8 due to relation between quantity of surrounding light and quantity of rear light.
Figure 12B:
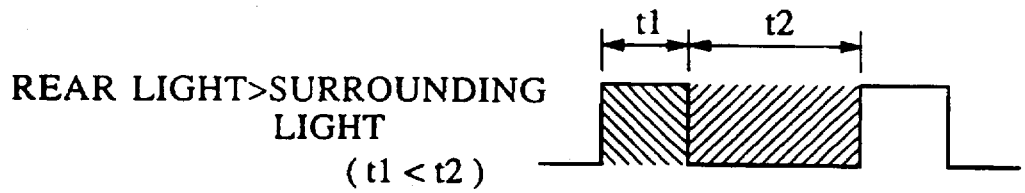
Figure 12C:
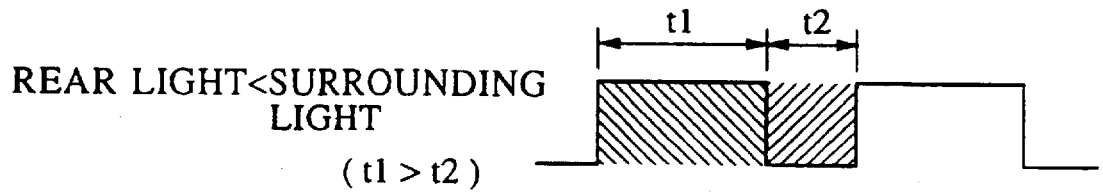

Since CdS has a characteristic similar to a visible light range of a human eye, it is most suitable for a photo-conductive cell used as the surrounding light detection device and the rear light detection device of the present invention. An example of characteristic of CdS is shown in FIG. 11. According to this figure, CdS has a characteristic according to which the value of resistance decreases as light quantity increases and value of resistance increases as light quantity decreases. Accordingly, in an oscillation signal produced by the oscillation circuit 14 of FIG. 8, as shown in FIG. 4, the period t1 of the "H" level changes in accordance with the rear light quantity (i.e., it is shortened as it becomes brighter) and the period t2 of the "L" level changes in accordance with the surrounding light quantity (i.e., it is shortened as it becomes brighter). When the surrounding light quantity is equal to the rear light quantity, as shown in FIG. 12A, t1 becomes equal to t2. When the surrounding light quantity is smaller than the rear light quantity, as shown in FIG. 12C, t1 becomes smaller than t2. When the surrounding light quantity is larger than the rear light quantity, t1 becomes larger than t2. As will be described later, color fading energy is supplied to the EC element 20 during the period t1 and color imparting energy is supplied to the EC element 20 during the period t2 and, accordingly, a color imparting tendency appears when t1 is smaller than t2 and a color fading tendency appears when t1 is larger than t2.

If, in controlling the amount of coloration in accordance with relation between surrounding light quantity and rear light quantity, division of a color imparting area and a color fading area is made along a solid line A in FIG. 13, there will arise a case where, when the surrounding light is strong (e.g., 5 to 30 lx or over) color is imparted if the rear light is strong notwithstanding that there is no need for coloration. Therefore, it is desirable that, when it is bright with the surrounding light being stronger than a predetermined value, this area should be made a color fading area as shown by a chain-and-dot line B regardless of the rear light quantity. Further, according to the division of area by the solid line A, there will arise a case where, when the surrounding light is very weak (e.g., 0.02 lx or below), even a very weak light from the rear will cause coloration. Therefore, it is desirable that, when it is dark with the surrounding light being below a predetermined value, this area below the predetermined value should be made a color fading area as shown by a dotted line C in FIG. 13.

The resistances R1 and R3 connected in series to the CdS 10 and 12 in FIG. 8 are provided for performing the function of the chain-and-dot line B in FIG. 13 and the resistances R2 and R4 connected in parallel to the CdS 10 and 12 are provided for performing the function of the dotted line C in FIG. 13. More specifically, the periods t1 and t2 of "H" and "L" levels of the oscillation output of the oscillation circuit 14 of FIG. 8 are expressed in the following manner:

$$t1 = \{(R4 \cdot r12)/(R4 + r12) + R3\} \cdot C1 \times 1.1 \quad (1)$$

$$t2 = \{(R2 \cdot r10)/(R2 + r10) + R1\} \cdot C1 \times 1.1 \quad (2)$$

where r10 represents resistance value of CdS 10 and r12 represents resistance value of CdS 12.

According to the equation (2), resistance value r10 of CdS 10 decreases as the surrounding light becomes stronger (see FIG. 11) and, therefore, the color imparting energy supply period t2 is shortened. However, since there is the resistance R1, the decreasing tendency of the period t2 is weakened as the surrounding light becomes stronger than a certain value. Further, according to the equation (1), resistance value r12 of CdS 12 decreases as the rear light becomes stronger and, therefore, the color fading energy supply period t1 is shortened. However, since there is the resistance R3, the decreasing tendency of the period t1 is weakened as the rear light becomes stronger than a certain value. Consequently, in an area where both the surrounding light and the rear light are strong, the duty factor of the oscillation signal becomes stable at about 50% and difference between the color imparting energy and the color fading energy becomes small. Assuming now that characteristic of reflectivity of the EC antiglare mirror is so set that the duty factor of the oscillation signal exhibits the maximum reflectivity (e.g., 70%) at 50% or over (i.e., b=about 50% in FIG. 7), a high reflectivity characteristic is realized at the duty factor of about 50% and a color faded state thereby is maintained.

On the other hand, according to the equation (2), resistance value r10 of of the CdS 10 increases as the surrounding light becomes weaker and, therefore, the color imparting energy supply period t2 is prolonged. Since, however, there is the resistance R2, the increasing tendency of the period t2 is weakened when the surrounding light becomes weaker than a certain value. Further, according to the equation (1), resistance value r12 of the CdS 12 increases as the rear light becomes weaker and, therefore, the color fading energy supply period t1 is prolonged. Since, however, there is the resistance R4, the increasing tendency of the period t1 is weakened when the rear light becomes weaker than a certain value. Consequently, in an area where both the surrounding light and the rear light are weak, the duty factor of the oscillation signal becomes stable at about 50% and difference between the color imparting energy and the color fading energy thereby becomes small. Consequently, the EC antiglare mirror becomes of a substantially high reflectivity characteristic and the color faded state thereby is maintained.

In FIG. 8, the oscillation circuit 14 produces oscillation signals having "H level of about +1.6 V and "L" level of about −1.6 V. A capacitor C4 is provided for preventing occurrence of noise on the power supply line. The EC element drive circuit 24 has two switching transistors Q1 and Q2 which are complementary push-pull connected between positive and negative power source voltages of about +1.6 V and −1.6 V. Resistances R6 and R7 are connected in series between the power supply line of about +1.6 V and the output terminal of the oscillation circuit 14 and voltage at the junction of the resistances R6 and R7 is applied to the base of the transistor Q1. Resistances R8 and R9 are connected in series between the power supply line of about −1.6 V and the output terminal of the oscillation circuit 14 and voltage at the junction of the resistances R8 and R9 is applied to the base of the transistors Q2. By adopting this construction, when the output of the oscillation circuit 14 is at the "H" level, the transistor Q1 is turned off and the transistor Q2 is turned on thereby supplying energy in the color fading direction to the EC element 20. When the output of the oscillation circuit 14 is at the "L" level, the transistor is turned on and the transistor Q2 is turned off thereby supplying energy in the color imparting direction to the EC element 20. Since resistances R10 and R11 which constitute energy supply restricting elements are connected in series to the transistors Q1 and Q2, supply of energy (supply of current) in the color imparting and color fading directions is restricted whereby power consumption and heating of the EC element 20 are restricted. Since the EC element 20 is electrically the same as capacity, time constant circuits are established with the resistances R10 and R11 (R10 and R11 are respectively 5 Ω) whereby speed of response in color imparting and color fading is reduced.

The oscillation signal provided by the oscillation circuit 14 is applied also to the color imparting current change judgement circuit 36 and is integrated (i.e., averaged) by an integrating circuit 40 consisting of a resistance R12 and a capacitor C5. Time constant of the integrating circuit 40 is about 0.11 second assuming that R12 is 100 k Ω, R13 is 7.6 k Ω, R14 is 3.6 k Ω and C5 is 1 μF. A comparator 42 compares the output voltage of the integrating circuit 40 with a reference voltage obtained by dividing voltage between the positive and negative power source voltages of +1.6 V and −1.6 V with resistances R13 and R14. When the output voltage of the integrating circuit 40 is lower than the reference voltage (i.e., the duty factor of the output drive pulse of the oscillation circuit 14 is lower, in other words, the rear light quantity is larger assuming that the surrounding light quantity is constant), the comparator 42 produces an output "H" and, when the output voltage of the integrating circuit 40 is higher than the reference voltage (i.e., the duty factor of the output drive pulse of the oscillation circuit 14 is higher, in other words, the rear light quantity is smaller assuming that the surrounding light quantity is constant), the comparator 42 produces an output "L". the output "H" of the comparator 42 constitutes a command which causes a drive current to be provided from the color imparting current changing EC element drive circuit 38 and the output "L" of the comparator 42 constitutes a command which prohibits outputting of the drive current from the drive circuit 38. The output signal of the comparator 42 is applied to the base of the transistor Q3 and is supplied to the color imparting current changing EC element drive circuit 38 through the collector of the transistor Q3.

In the color imparting current changing EC element drive circuit 38, resistances R15 and R16 are connected in series between a line of the power source of +1.6 V and the output terminal of the oscillation circuit 14 and the collector of the transistor Q3 and the base of the transistor Q4 are connected at its base to a junction of the resistances R15 and R16. The transistor Q4 is connected at its emitter to a line of the power source of +1.6 V and connected at its collector to the EC element 20 through a current restricting resistance R17. Accordingly, the transistor Q4 and the transistor Q1 are provided in parallel between the line of the power source of +1.6 V and the EC element 20 thereby supplying a drive current in the color imparting direction to the EC element 20.

The operation of the color imparting current drive circuit 34 shown in FIG. 8 will be described with reference to FIGS. 14A and 14B.

When rear light is bright, as shown in FIG. 14A, the duty factor of the output pulse of the oscillation circuit 14 is small and, therefore, the output of the comparator 42 is "H" and the transistor Q3 is in an open state. Accordingly, the transistor Q4 is turned on and off repeatedly simultaneously with the transistor Q1 by the output pulse of the oscillation circuit 14 thereby supplying, together with the transistor Q1, a color imparting current to the EC element 20. Therefore, the current value of the drive pulse for the EC element 20 increases at this time and the response speed increases. This increases the amount of imparted color immediately to mitigate glare of light when glare suddenly comes from the rear while running at night.

When the rear light is dark, as shown in FIG. 14B, the duty factor of the output pulse of the oscillation circuit 14 is large and, therefore, the output of the comparator 42 is "L". The transistor Q3 is on and the transistor Q4 is at rest so that no drive current is supplied from the color imparting current changing circuit 34. Accordingly, the current value of the drive pulse for the EC element 20 decreases and the response speed decreases. This prevents too frequent repetition of color imparting and color fading caused By a slight change in light.

The relation between the duty factor of the output pulse of the oscillation circuit and the mirror reflectivity is shown in FIG. 7. When the duty factor is low (i.e., when the rear light quantity is larger), the amount of change in reflectivity to the change in the rear light quantity is larger so that, when glare from the rear takes place suddenly at night, reflectivity decreases largely to mitigate glare. When the duty factor is high (i.e., when the rear light quantity is smaller), the amount of change in reflectivity to the change in the rear light quantity is small so that the problem caused by an excessively large change in reflectivity to a slight change in light can be overcome.

In the above described embodiment, the drive current value is changed by adding a separate drive current route to an ordinary drive current route. Alternatively, the drive current value may be changed by selectively switching among currents routes of different drive current values. Without providing a separate drive circuit, the drive current value may also be changed stepwisely or continuously by providing, for example, a variable resistance means capable of automatically controlling a resistance value instead of providing the resistance R10.

What is claimed is:

1. An automatic antiglare mirror including an electrochromic element wherein its reflectivity is variably controlled by driving the electrochromic element by a pulse voltage and changing a duty factor of the pulse voltage in response at least to quantity of rear light so that, when quantity of rear light is smaller, the amount of coloration of the electrochromic element is smaller whereas, when quantity of rear light is larger, the amount of coloration of the electrochromic element is larger, said automatic antiglare mirror comprising reflectivity change ratio changing means for changing the ratio of change in the reflectivity to the duty factor of the pulse voltage so that, when a duty factor in a color imparting direction is smaller, the ratio of change in the reflectivity to the duty factor is smaller; when the duty factor in a color fading direction is larger, the ratio of change in reflectivity to the duty factor is smaller; when the duty factor in the color imparting direction is larger, the ratio of change in the reflectivity to the duty factor is larger; and when the duty factor in the color fading direction is smaller, the ratio of change in the reflectivity to the duty factor is larger.

2. An automatic antiglare mirror including an electrochromic element wherein its reflectivity is variably controlled by driving the electrochromic element by a pulse voltage and changing duty factor of the pulse voltage in response at least to quantity of rear light so that, when quantity of rear light is smaller, the amount of coloration of the electrochromic element is smaller whereas, when quantity of rear light is larger, the amount of coloration of the electrochromic element is higher, said automatic antiglare mirror comprising current value control means for controlling the current value of the pulse voltage driving the electrochromic element is such a manner that, when the quantity of rear light is smaller, the current value of the pulse voltage in a color imparting direction is smaller, whereas when quantity of rear light is larger, the current value is larger.

3. An automatic antiglare mirror as defined in claim 2 wherein said current value control means controls the current value in response to the duty factor of the pulse voltage.

4. An automatic antiglare mirror including:

(a) an electrochromic element wherein its reflectivity is variably controlled by driving the electrochromic element by a pulse voltage and changing duty factor of the pulse voltage in response to quantity of rear light so that, when voltage in response at least to the quantity of rear light is smaller, the amount of coloration of said electrochromic element is smaller and when the quantity of said rear light is larger, the amount of the coloration of said electrochromic element is higher;

(b) a main drive current circuit driven by said pulse voltage comprising in combination a first transistor (Q1), a second transistor (Q2), a first resistor (R10), a second resistor (R11) and a current supply which supplies a drive current constantly to said electrochromic element;

(c) a supplemental drive current circuit comprising a combination of a transistor (Q4) and a resistor (R17) which supply additional drive current to said electrochromic element; and (d) means for supplying drive current to said electrochromic element only from said main drive current circuit when the intensity of the rear light is small and means for supplying current to said electrochromic element both from said main drive current circuit and from said supplemental drive current circuit when the intensity of the rear light is large.

* * * * *